(12) United States Patent
Nohtomi et al.

(10) Patent No.: US 6,321,159 B1
(45) Date of Patent: Nov. 20, 2001

(54) DRIVING LANE TRACKING SYSTEM

(75) Inventors: Shinya Nohtomi; Shinichiro Horiuchi, both of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/418,967

(22) Filed: Oct. 14, 1999

(30) Foreign Application Priority Data

Apr. 20, 1999 (JP) .................................................. 11-112117

(51) Int. Cl.[7] .................................................... B60K 31/00
(52) U.S. Cl. .............................. 701/207; 701/28; 701/96; 701/220; 18/196; 340/903
(58) Field of Search ............................. 701/207, 28, 116, 701/117, 118, 213, 220, 300, 96; 180/169; 340/903

(56) References Cited

U.S. PATENT DOCUMENTS 5,934,399 * 8/1999 Iiboshi et al. .................... 108/169

OTHER PUBLICATIONS

Clarke, D.W. et al., "Generalized Predictive Control—Part I. The Basic Algorithm*," *Automatica*, vol. 23, No. 2, pp. 137–148 (1987).
Clarke, D.W. et al., "Generalized Predictive Control—Part II. Extensions and Interpretations*," *Automatica*, vol. 23, No. 2, pp. 149–160 (1987).
Peng, H., "Preview Control for Vehicle Lateral Guidance in Highway Automation," *Journal of Dynamic Systems, Measurement, and Control*, vol. 115, pp. 679–686 (Dec. 1993).
Nohtomi, S. and Horiuchi, S., "A Path Tracking Control System Using Generalized Predictive Control Theory," Proceeding of JSAE Semi–Annual Convention, No. 62–98, pp. 9–12 (Oct. 20, 1998).
Mouri, H. and Furusho, H., "Automatic Path Tracking Using Linear Quadratic Control Theory—Control Method for a Straight Path," Proceedings of JSAE Semi–Annual Convention, pp. 45–48 (May 1997).
Furusho, H. and Mour, H., "Automatic Path Tracking Using Linear Quadratic Control Theory—Control Method for a Curved Path," Proceedings of JSAE Semi–Annual Convention, pp. 49–52 (May 1997).

* cited by examiner

*Primary Examiner*—William A. Cuchlinski, Jr.
*Assistant Examiner*—Arthur D. Donnelly

(57) ABSTRACT

Preview information is obtained by processing data from image data of a CCD camera, and it is treated as a known disturbance. Then, models for a vehicle and a target road path, typically consisting of DARMA (deterministic autoregressive moving average) models are prepared so as to give a relationship between a front wheel steering angle command and a lateral deviation of the vehicle. An extended generalized predictive control theory is applied to these models so as to compensate for tracking errors that may arise as a result of the known disturbance. Thus, a favorable tracking capability can be achieved with a relatively simple structure, by executing a prediction control which requires only such variable that can be measured both easily and accurately.

6 Claims, 7 Drawing Sheets

DRIVING LANE TRACKING SYSTEM

TECHNICAL FIELD

The present invention relates to a driving lane tracking system for guiding a traveling motor vehicle so as to stay within a prescribed driving lane.

BACKGROUND OF THE INVENTION

In recent years, a number of proposals have been made to enable a motor vehicle to automatically track a driving lane. There are two known major control principles.

(1) The vehicle is equipped with a video camera, typically consisting of a CCD camera, which gathers information on the current position of the vehicle, and sensors for detecting certain dynamic state variables of the vehicle. The changes in the curvature of the road path are treated as unknown disturbances. The vehicle follows the driving lane by receiving information on the deviation of the vehicle position from the center of the driving lane and the dynamic state variables of the vehicle as a feedback signal. Refer, for instance, to "Automatic Path Tracking Using Linear Quadratic Control Theory—Control Method for a Curved Path", by H. Furusho and H. Mouri, Proceedings of JSAE Semi-Annual Convention, No.972, May 1997, pp. 49–52.

(2) The vehicle is equipped with a video camera which gathers information on the road path lying ahead of the vehicle, and sensors for detecting certain dynamic state variables of the vehicle. A preview control based on the predicted course of the road path is carried out in combination with the feedback control based on the dynamic state variables of the vehicle. Refer, for instance, to "Preview Control for Vehicle Lateral Guidance in Highway Automation", by H. Peng and M. Tomizuka, ASME Journal of Dynamic Systems, Measurement and Control, December 1993, Vol. 115, pp. 679–686.

According to the first principle (1), because the control process relies on the current course information, there is some difficulty in achieving an optimum selection of control parameters for successfully tracking the curved path of the road, and a somewhat excessive time delay or overshoot is inevitable. In the case of the second principle (2), a smooth tracking of the course of the road may be possible, but the state variables for the feedback control include those which cannot be measured directly, and the high-speed estimation of such state variables requires a high speed computing unit. Therefore, the system tends to be unacceptably complex and expensive.

BRIEF SUMMARY OF THE INVENTION

In view of such problems of the prior art, a primary object of the present invention is to provide a driving lane tracking system which demonstrates a favorable tracking capability and can be implemented with a relatively simple structure.

A second object of the present invention is to provide a driving lane tracking system which can execute a prediction control by using only such variable that can be measured both easily and accurately.

According to the present invention, such objects can be accomplished by providing a driving lane tracking system, comprising: road path previewing means for detecting a current position of a vehicle with respect to a road path, and previewing a target road path lying a certain distance ahead of a vehicle; a steering angle sensor for detecting a current steering angle of the vehicle; a storage unit for storing data obtained from the road path previewing means and the steering angle sensor; a steering actuator which at least assists a steering effort made by a vehicle operator; and a control unit for controlling the steering actuator so as to optimize a lateral deviation of the vehicle with respect to the target road path according to data on the past, current and target road path.

Thus, preview information is obtained by processing data from the preview means such as image data of a CCD camera, and it is treated as a known disturbance. Then, models for a vehicle and a target road path, typically consisting of DARMA (deterministic auto-regressive moving average) models are prepared so as to give a relationship between a front wheel steering angle command and a lateral deviation of the vehicle. Preferably, an extended generalized predictive control theory is applied to these models so as to compensate for tracking errors that may arise as a result of the known disturbance. For details of the generalized predictive control theory, reference should be made to "Generalized Predictive Control—Part I, The Basic Algorithm", by D. W. Clark, C. Mohtadi, and P. S. Tuffs, Automatica, Vol. 23, No. 2, pp. 137–148, 1987, and "Generalized Predictive Control—Part II, Extensions and Interpretations", by D. W. Clark, C. Mohtadi, and P. S. Tuffs, Automatica, Vol. 23, pp. 149–160, 1987.

Typically, the road path previewing means comprises an electronic camera mounted on the vehicle which is adapted to identify the road path by detecting a line marked on a road to define a driving lane. Additionally or alternatively, the road path previewing means may comprise a navigation system which can identify a current vehicle position in relation to a map incorporated therein. The navigation system may be either a global positioning system using satellites and incorporated with map information or an inertial positioning system likewise incorporated with map information. The vehicle may further comprise a radar device for detecting other objects on the road such as other motor vehicles so that the vehicle may avoid coming undesirably close to other vehicles while tracking the road path. The output of the control unit may either wholly control the steering action or apply a supplemental or otherwise assistive steering torque reaction to the steering wheel so as to aid the effort of the vehicle operator to track the road path.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
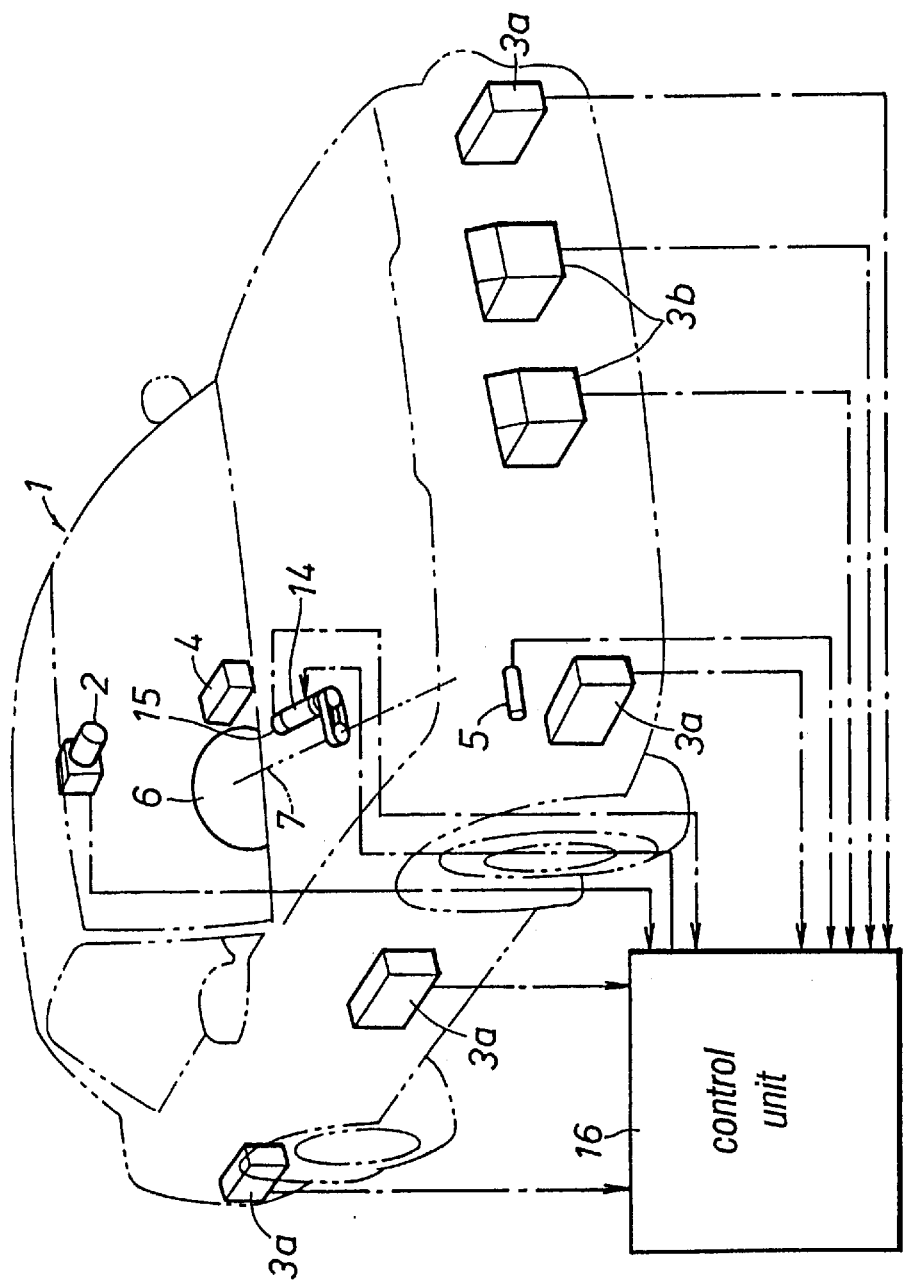
FIG. 1 is an overall diagrammatic view of a vehicle equipped with a control system embodying the present invention.

FIG. 1 generally illustrates an automobile equipped with a driving lane tracking control system embodying the present invention. A CCD camera 2 is mounted to an upper part of the interior of a vehicle body 1 adjacent to a rearview mirror so that the road path ahead of the vehicle may be constantly monitored. By appropriately processing the video signal from the CCD camera 2, the driving lane is detected, and the position and direction of the vehicle in relation to the driving lane are identified. Typically, a driving lane may be detected by identifying a line marking on the road defining the driving lane.

A plurality of side radar devices 3a are mounted on either side of the vehicle body so that the relative positions and speeds of other vehicles, in particular the relative positions and speeds of those approaching obliquely from the rear, may be detected. A yaw rate sensor 4 is provided in a central part of the vehicle body 1 to detect the yaw angle of the vehicle body 1 around a vertical axial line passing through the gravitational center of the vehicle body 1. A vehicle speed sensor 5 is provided in association with a drive shaft of the vehicle to measure the rotational speed of the drive shaft as data for determining the vehicle speed. A front radar device 3b is also provided on the vehicle body 1 to detect an object in front of the vehicle.

Figure 2:
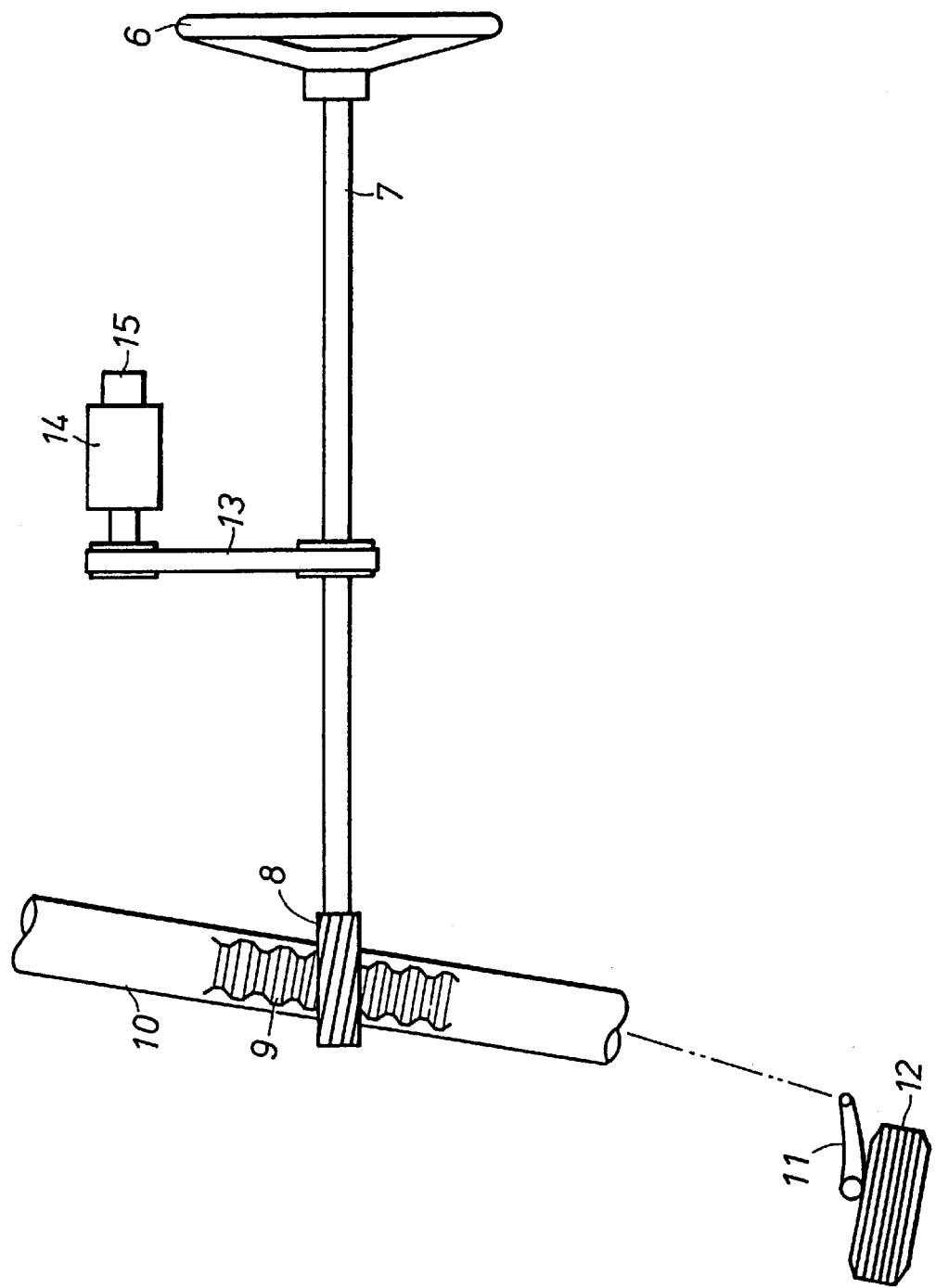
FIG. 2 is a simplified view of the steering device of the vehicle illustrated in FIG. 1.

Referring also to FIG. 2, the steering device of the illustrated embodiment comprises a steering wheel 6 for applying a steering input by the vehicle operator, a steering shaft 7 directly connected to the steering wheel 6, and a pinion 8 fixedly attached to a lower end of the steering shaft 7, a rack shaft 10 meshing with the pinion 8 to convert the rotational motion of the pinion 8 (or that of the steering wheel 6) to a linear motion, knuckle arms 11 pivotally attached to either end of the rack shaft 10 via a tie rod (not shown in the drawing), and front wheels 12 supported by hub carriers (not shown in the drawing) integrally provided with the knuckle arms 11. A cogged belt 13 is passed around a pulley which is fixedly attached to an intermediate part of the steering shaft 7 to transmit a supplemental steering torque produced by an electric motor 14 serving as a steering actuator. A per se known rotary encoder 15 is connected to an axial end of the output shaft of the electric motor 14 to detect the rotational angle of the steering shaft 7 or the steering wheel steering angle.

The signals from the CCD camera 2, the radar devices 3a and 3b, the yaw rate sensor 4, the vehicle speed sensor 5 and the rotary encoder 15 are forwarded to a control unit 16 for determining the supplemental steering torque to the steering shaft 7 as described hereinafter. The control unit 16 is incorporated with a storage unit which can retain data from various sensors at least for a certain time period so that the past data may be made available for the operation of the control unit 16

Suppose that the fore-and-aft speed u of the vehicle is constant. Then, the relationship between the lateral speed v, the yaw rate γ, and the front wheel steering angle $\delta_f$ can be represented by a two-degree of freedom model given by the following two equations (Eq. 1) and (Eq. 2).

$$\frac{dv}{dt} = \frac{\overline{A}_1}{u}v - \left(u - \frac{\overline{A}_2}{u}\right)\gamma + \overline{B}_1\delta_f \tag{1}$$

$$\frac{dr}{dt} = \frac{\overline{A}_3}{u}v + \frac{\overline{A}_4}{u}\gamma + \overline{B}_2\delta_f \tag{2}$$

It is also supposed that the steering angle $\delta_f$ is given as an output of an actuator which has a first-order time delay and receives a steering command $\delta_c$. This is represented by the following equation (Eq. 3).

$$\frac{d\delta_f}{dt} = -\overline{B}_3\delta_f + \overline{B}_3\delta_c \tag{3}$$

The parameters $A_i$ and $B_i$ which are unique to the particular vehicle can be given by the following equation (Eq. 4).

$$\overline{A}_1 = -\frac{2(K_f + K_r)}{m}, \quad \overline{A}_2 = -\frac{2(l_f K_f = l_r K_r)}{m} \tag{4}$$

$$\overline{A}_3 = -\frac{2(l_f K_f + l_r K_r)}{I}, \quad \overline{A}_4 = -\frac{2(l_f^2 K_f + l_f^2 K_r)}{I}$$

$$\overline{B}_1 = \frac{2K_f}{m}, \quad \overline{B}_2 = \frac{2l_f K_f}{I}, \quad \overline{B}_3 = \frac{1}{T_f}$$

where $T_f$ is the time constant of the steering actuator, $I_f$ is the distance between the front axle and the gravitational center, $I_r$ is the distance between the rear axle and the gravitational center, $K_f$ is the front wheel cornering power, and $K_r$ is the rear wheel cornering power.

Figure 3:
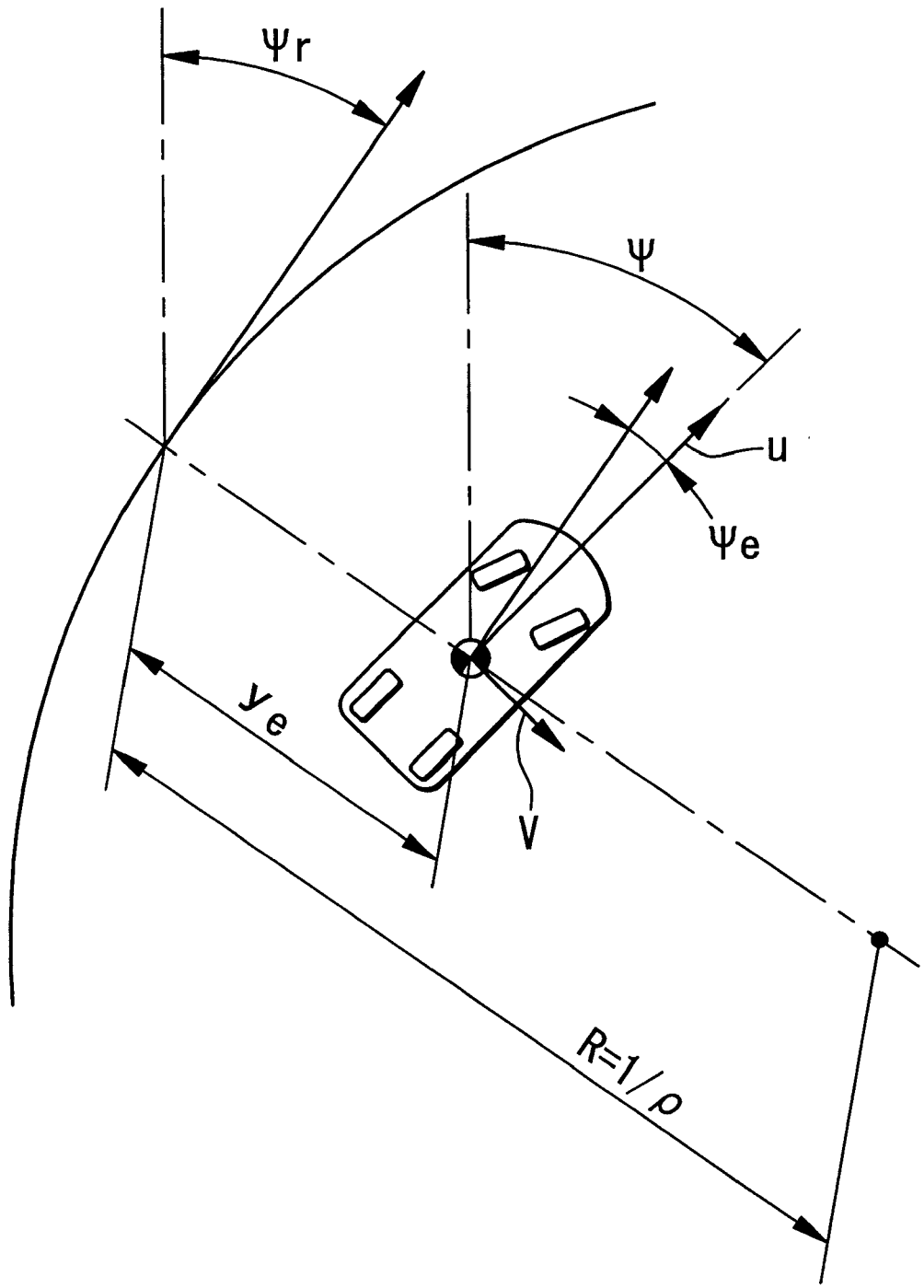
FIG. 3 is a diagram showing the relationship between a target road path and an actual heading of the vehicle.

FIG. 3 illustrates the geometrical relationship between the actual course the vehicle is taking and the target road path which is obtained from the image data of the CCD camera 2 (additionally or alternatively from the map data of a navigation system and/or an electromagnetic homing signal of a transmitter installed on the road). In FIG. 3, ψ is the angle of the actual heading of the vehicle relative to a reference direction, $\psi_r$ is the angle of the target road path relative to this reference direction, $\psi_e$ is the angular deviation of the actual heading of the vehicle relative to the target road path, $Y_e$ is the lateral deviation of the vehicle from the target road path and R is the radius of curvature of the target road path. The relationships given by the following equations (Eq. 5) to (Eq. 7) hold between these variables $$\psi_e = \psi - \psi_r \tag{5}$$

$$\gamma_e \approx \gamma - \frac{R}{u} \tag{6}$$

$$v_e = \frac{dy_e}{dt} \approx v + u\psi_e \tag{7}$$

where $Y_e$ is the time derivative of the deviation of the actual yaw rate from the target yaw rate, and $v_e$ is the time derivative of the lateral deviation.

From Equations (Eq. 5) to (Eq. 7), the following equations (Eq. 8) and Eq. (9) can be derived.

$$\frac{d\gamma}{dt} = \frac{d\gamma_e}{dt} \tag{8}$$

-continued $$\frac{dv}{dt} = \frac{dv_e}{dt} - u\gamma_e \quad (9)$$

By substituting these relationships into Equations (1) to (3), the following state equation (Eq. 10) can be obtained.

$$\frac{d}{dt}\begin{bmatrix} y_e \\ v_e \\ \psi_e \\ \gamma_e \\ \delta_e \end{bmatrix} = \begin{bmatrix} 0 & 1 & 0 & 0 & 0 \\ 0 & \overline{A}_1/u & -\overline{A}_1 & \overline{A}_2/u & \overline{B}_1 \\ 0 & 0 & 0 & 0 & 0 \\ 0 & \overline{A}_3/u & -\overline{A}_3 & \overline{A}_4/u & B_2 \\ 0 & 0 & 0 & 0 & -\overline{B}_3 \end{bmatrix}\begin{bmatrix} y_e \\ v_e \\ \psi_e \\ \gamma_e \\ \delta_e \end{bmatrix} + \quad (10)$$

$$\begin{bmatrix} 0 \\ 0 \\ 0 \\ 0 \\ \overline{B}_3 \end{bmatrix}\delta_3 + \begin{bmatrix} 0 \\ \overline{A}_2 - u^2 \\ 0 \\ \overline{A}_4 \\ 0 \end{bmatrix}\rho$$

Where $\rho$ is the curvature of the target road path.

The continuous-time state equation (Eq. 10) is then converted into a discrete-time model (DARMA model; Deterministic Auto-Regressive Moving Average model) represented by the following equation (Eq. 11) to apply the GPC theory to the above defined vehicle model and road path model.

$$A(q^{-1})y_e(k) = B(q^{-1})\delta_c(k-1) + D(q^{-1})\rho(k-1) \quad (11)$$

where k denotes the k-th sampling time. A, B and C are polynomials (Eqs. 12 to 14 which are described by a time-delay operand $q^{-1}$.

$$A(q^{-1}) = 1 + a_1 q^{-1} + \ldots + a_n q^{-n} \quad (12)$$

$$B(q^{-1}) = b_0 + b_1 q^{-1} + \ldots + b_m q^{-m} \quad (13)$$

$$C(q^{-1}) = d_0 + d_1 q^{-1} + \ldots + d_m q^{-m} \quad (14)$$

where n and m denote the orders of the polynomials which are selected as n=5 and m=4 in the illustrated embodiment.

In the DARMA model, the curvature $\rho$ of the part of the target road path up to M steps ahead may be considered as a known disturbance. In other words, the future values of $\rho$, or $\rho(k+1)$ (k=1, 2, . . . , M), are known information at the current sampling time.

To reduce the lateral deviation $Y_e$ to zero by introducing an integral property to the control system, the DARMA model given by Equation (11) is converted as defined by the following equation (Eq. 15).

$$\tilde{A}(q^{-1})y_e(k) = B(q^{-1})\Delta\delta_c(k-1) + D(q^{-1})\Delta\beta(k-1) \quad (15)$$

where $$\tilde{A}(q^{-1}) = \Delta A(q^{-1}) \quad (16)$$

$$\Delta = 1 - q^{-1} \quad (17)$$

The control input is designed such that an evaluation function J given by the weighted sums of the square of the lateral deviation and the square of the increment of the steering angle command value or by the following equation (Eq. 18) may be minimized.

$$J = \sum_{j=1}^{M}\{y_e^2(k+j) + \lambda\Delta\delta_c^2(k+j-1)\} \quad (18)$$

where $\lambda$ is a weighting coefficient for the increment.

To compute the evaluation function J (Eq. 18), the future lateral deviations are predicted according to the prediction at the k-th sampling time. It is represented by the following predictor based on the DARMA model of Equation (18).

$$y_e(k+l) = G_l(q^{-1})y_e(k) + H_l^b(q^{-1})\Delta\delta_c(k+l-1) + H_l^d(q^{-1})\Delta\rho(k+l-1), \, l \in \{1, 2, \ldots, M\} \quad (19)$$

where $$H_l^b(q^1) = F_l(q^{-1})B(q^{-1}) \quad (20)$$
$$= h_0^b + h_1^b q^{-1} + \cdots + h_{l+m-1}^b q^{-(l+m-1)}$$

$$H_l^d(q^{-1}) = F_l(q^{-1})D(q^1) \quad (21)$$
$$= h_0^d + h_1^d q^{-1} + \cdots + h_{l+m-1}^d q^{-(l+m-1)}$$

$$1 = F_l(q^{-1})\tilde{A}(q^{-1}) + q^{-1}G_l(q^{-1})l\rho\{1, 2, \ldots, M\} \quad (22)$$

The future lateral deviation given by Equation (19) consists of a part depending on known signals and predicted information, and a part depending on future inputs which are not known. The present invention treats the predicted information consisting of the curvature of the future road path as known information. By using this information, the following equation can be derived.

$$y_e = \overline{H}\Delta\overline{\delta}_c + \overline{P} \quad (23)$$

The vectors consist of M-dimensional vectors, and the following equations are obtained.

$$y_e = [y_e(k+1)y_e(k+2) \ldots y_e(k+M)]\Delta\overline{\delta}_c = [\Delta\delta_c(k)\Delta\delta_c(k+1) \ldots \Delta\delta_c(k+M-1)]\overline{P} = [p(k+1)p(k+2) \ldots p(k+M)] \quad (24)$$

The M×M matrix may be fully written as given by the following equation.

$$\overline{H} = \begin{bmatrix} h_0^b & 0 & \cdots & 0 \\ h_1^b & h_0^b & \cdots & 0 \\ \vdots & \vdots & \ddots & \vdots \\ h_{M-1}^b & h_{M-2}^b & \cdots & h_0^b \end{bmatrix} \quad (25)$$

From the above equations, the evaluation function J (Eq. 18) can be rewritten as given in the following.

$$J = y_e^T y_e + \lambda \overline{\Delta}_c^T \Delta \overline{\delta}_c \quad (26)$$
$$= (\overline{H}\Delta\overline{\delta}_c + \overline{P})^T(\overline{H}\Delta\overline{\delta}_c + \overline{P}) + \lambda\Delta\delta_c^T\Delta\overline{\delta}_c$$

From the condition under which the evaluation function J is minimized or $\partial J/\partial\delta_c = 0$, the following equation can be obtained.

$$\Delta\overline{\delta}_c = -(\overline{H}^T\overline{H} + \lambda I)^{-1}\overline{H}^T\overline{P} \quad (27)$$

Because the first component of the vector $\Delta\delta_c$ consists of $\delta_c(k)$, the increment $\Delta\delta_c(k)$ at the k-th sampling time can be given by the following equation (28).

$$\Delta\delta_c(k) = \bar{h}^T P \quad (28)$$

Therefore, the steering angle command value $\delta_c(k)$ at the k-th sampling time can be given by the following equation (29).

$$\delta_c(k) = \delta_c(k-1) + \bar{h}^T P \quad (29)$$

Now, the LQI control which combines an integration action to the more conventional LQ control is compared with the GPC control incorporating a prediction control of the present invention by using computer simulations.

Figure 4:
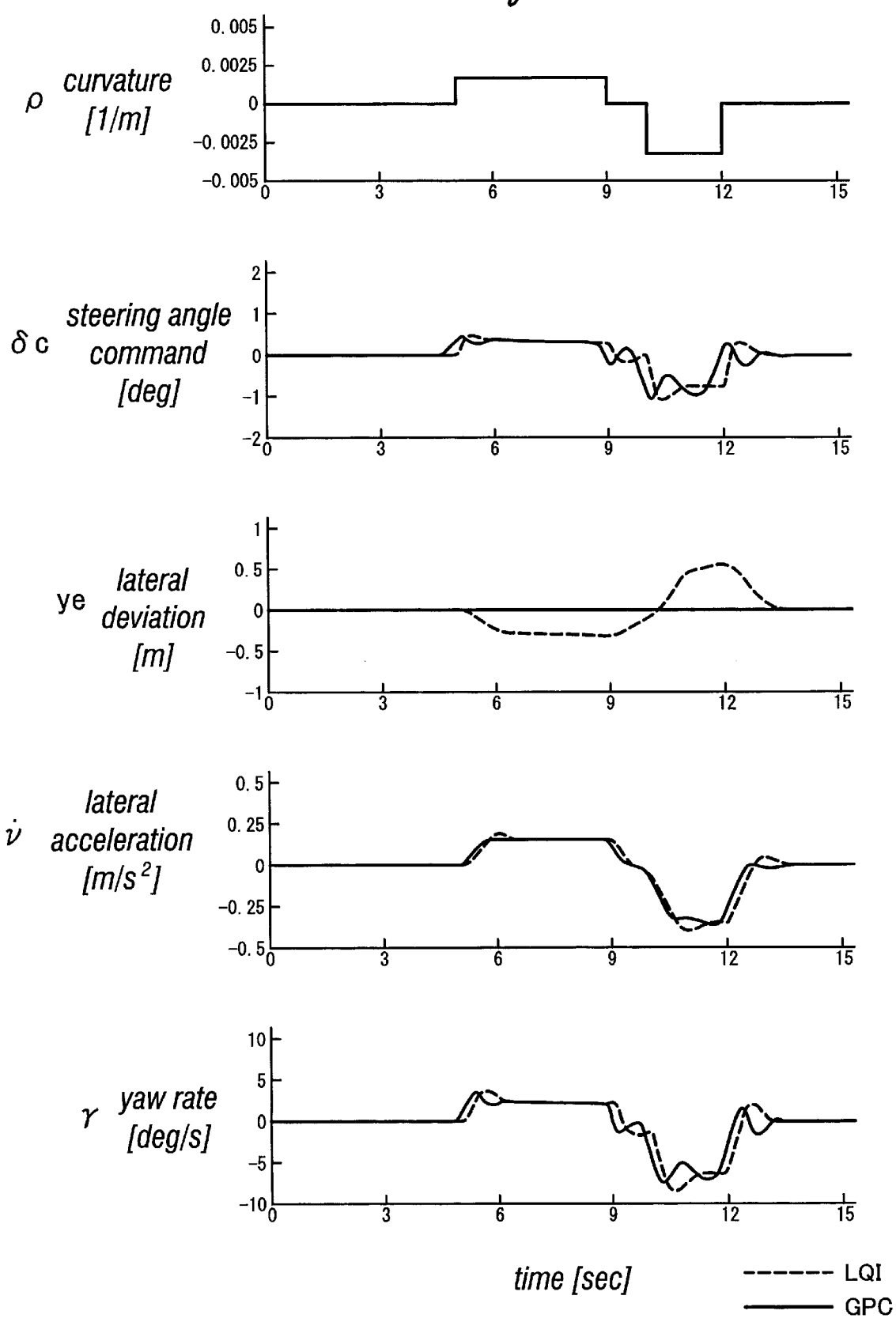
FIG. 4 shows the time responses of various parameters for given changes in the road curvature to compare the GPC control with the conventional LQI control when the magnitudes of the maximum steering command values are equalized in tracking the driving lane.

The responses of the GPC control and the LQI control can change significantly depending on the selection of the weighting coefficients. FIG. 4 show a result of comparison in which the weighting coefficients are varied so as to substantially equalize the magnitudes of the maximum command signals when tracking a given target road path. As can be seen from this drawing, the GPC control starts a steering action before the actual change in the curvature of the target course takes place, and the lateral deviation (steady-state tracking error) is reduced to zero. It means that the vehicle can smoothly track the driving lane. On the other hand, according to the LQI control, because it does not make use of predicted information, the steering action begins only after the road path curvature has started changing, and the lateral deviation is significant. Therefore, the LQI control is not as effective as the GPC control in enabling the vehicle to track the driving lane. Because the LQI control gives rise to larger lateral accelerations than the GPC control, the GPC control is superior over the LQI control in terms of ride quality.

Figure 5:
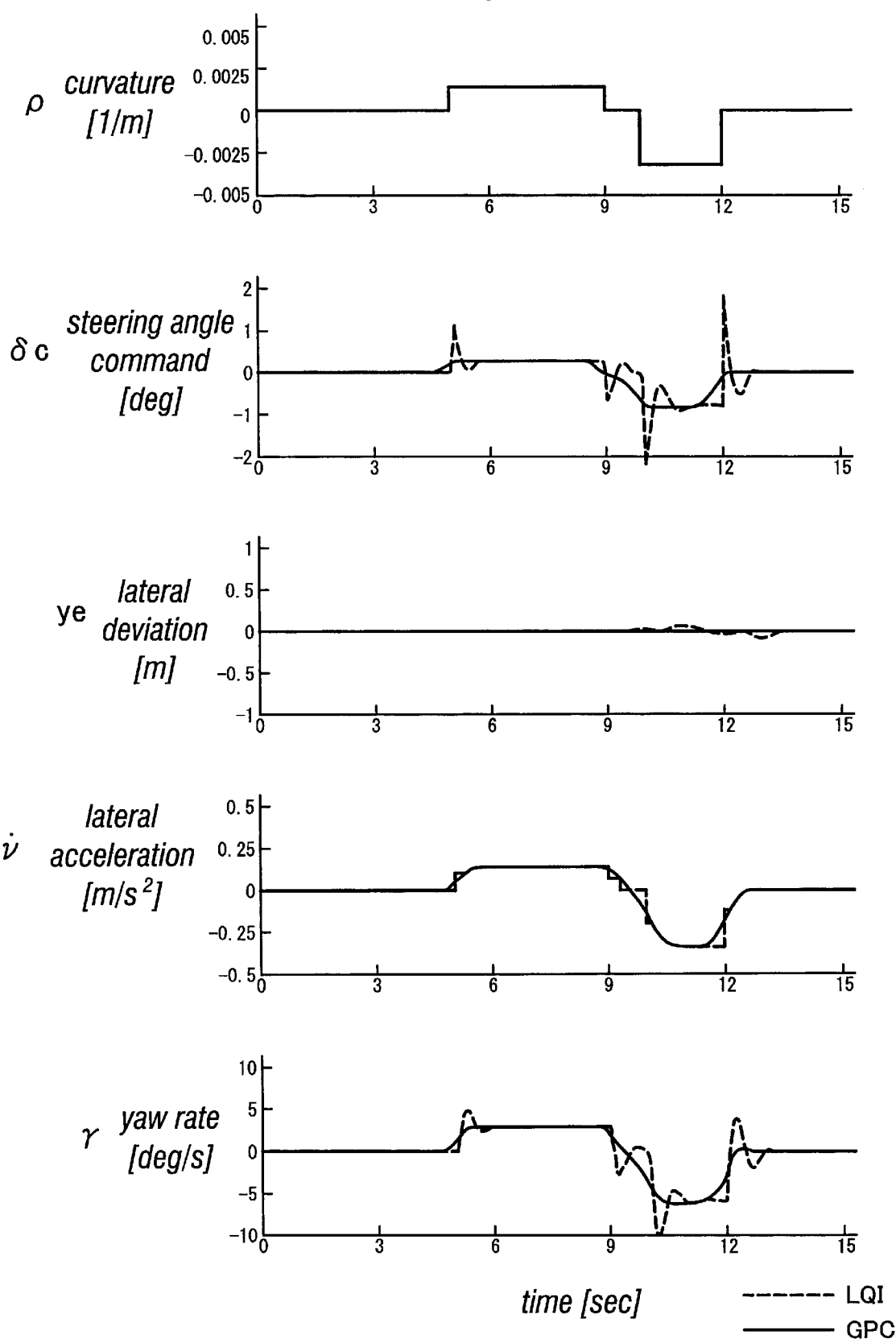
FIG. 5 shows graphs similar to those of FIG. 4 when the lateral deviations are equalized.

FIG. 5 compares the responses of the GPC control and the LQI control when the weighting coefficient of the LQI control is varied such that similar lateral deviations may be produced. In this case, the steering angle command value of the LQI control changes impulsively, and this significantly impairs the ride quality through stepwise changes in lateral acceleration and oscillatory changes in yaw rate.

Figure 6:
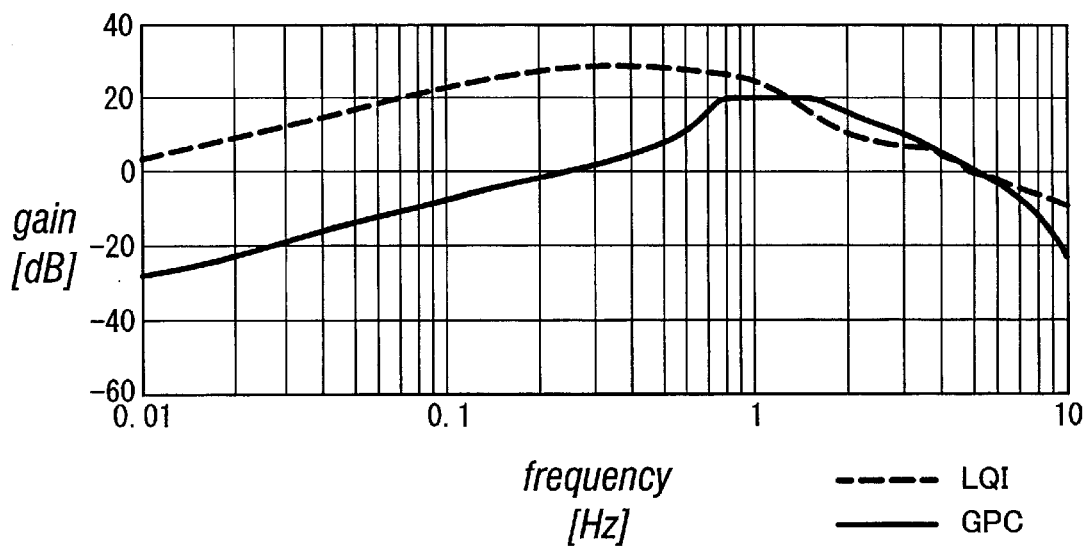
FIG. 6 compares the GPC control with the conventional LQI control in terms of the frequency response of the lateral deviation to an input of the road curvature.

To show the properties of the GPC control in the frequency domain, FIG. 6 compares the frequency responses of the GPC control and the LQI control using the road curvature as the input and the lateral deviation as the output. From this drawing, it can be seen that the GPC control demonstrates a lower gain than the LQI control in a low frequency range, pointing to the superior capability of the GPC control to track the driving lane.

Figure 7:
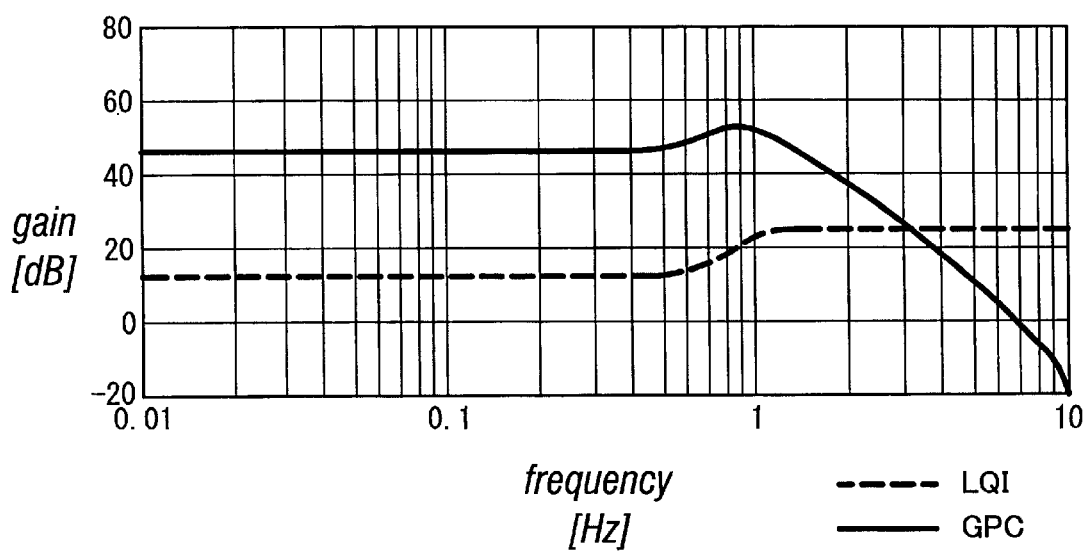
FIG. 7 compares the GPC control with the conventional LQI control in terms of the frequency response of the steering command value to an input of the road curvature.

FIG. 7 compares the frequency responses of the GPC control and the LQI control using the road curvature as the input and the steering angle command value as the output. Because the LQI control demonstrates a flat frequency response, it tends to produce a steering angle command containing high frequency components in response to stepwise changes in the road curvature. On the other hand, the GPC control produces a steering angle command consisting only of relatively low frequency components, it is expected that the GPC control can track a driving lane more smoothly.

Figure 8:
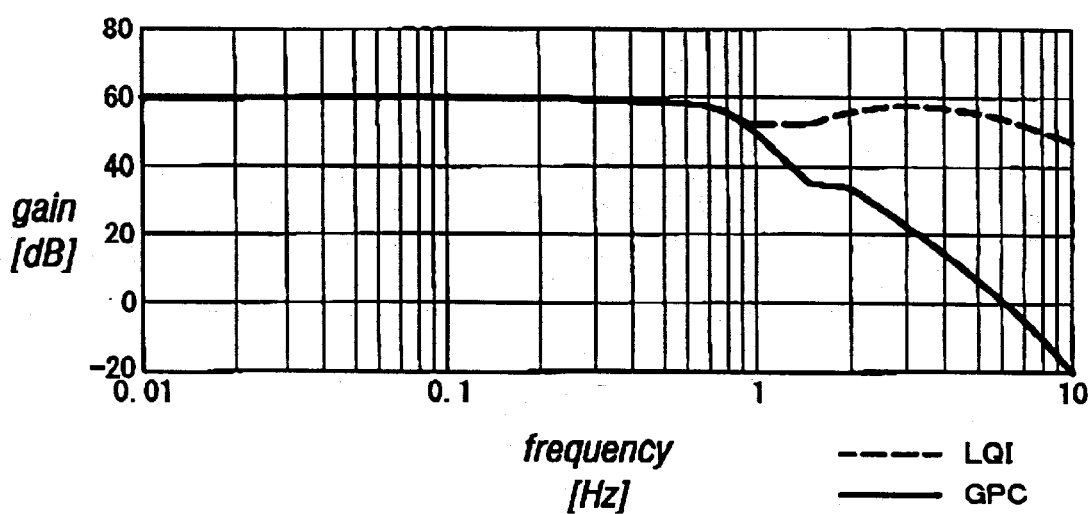
FIG. 8 compares the GPC control with the conventional LQI control in terms of the frequency response of the lateral acceleration to an input of the road curvature.

FIG. 8 compares the frequency responses of the GPC control and the LQI control using the road curvature as the input and the lateral acceleration as the output. According to the graph, it can be seen that the GPC control demonstrates a favorable damping in a high frequency range so that it can maintain a favorable ride quality even when there are sharp changes in the curvature of the road, and the measurement of the road curvature involves a substantial amount of high frequency noises.

If the control command value consists of a steering supplemental torque, instead of the front wheel steering angle, the present invention can be applied not only to a simple driving lane tracking control but also to a vehicle operator assisting system for varying the force required to turn the steering wheel depending on the state of the motor vehicle or other factors.

Thus, according to the present invention, by using predicted information or by giving an integration property to the feedback loop, it is possible to achieve both a required driving lane tracking capability and a favorable ride quality at the same time.

Although the present invention has been described in terms of preferred embodiments thereof, it is obvious to a person skilled in the art that various alterations and modifications are possible without departing from the scope of the present invention which is set forth in the appended claims.

What is claimed is:

1. A driving lane tracking system, comprising:
   road path previewing means for detecting a current position of a vehicle with respect to a road path, and previewing a target road path lying a certain distance ahead of a vehicle;
   a steering angle sensor for detecting a current steering angle of the vehicle;
   a storage unit for storing data obtained from said road path previewing means and said steering angle sensor;
   a steering actuator which at least assists a steering effort made by a vehicle operator; and
   a control unit for controlling said steering actuator so as to minimize a weighted sum of a square of the lateral deviation with respect to said target road path and a square of an increment of the steering angle command value at a plurality of future points according to data on the past, current and target road path.

2. A driving lane tracking system according to claim 1, wherein said control unit incorporates a computer algorithm based on a generalized predictive control theory which treats changes in the curvature of the road path as known disturbances.

3. A driving lane tracking system according to claim 1, wherein said road path previewing means comprises an electronic camera mounted on said vehicle.

4. A driving lane tracking system according to claim 3, wherein said road path previewing means is adapted to identify the road path by detecting a line marked on a road to define a driving lane.

5. A driving lane tracking system according to claim 1, wherein said road path previewing means comprises a navigation system which can identifies a current vehicle position in relation to a map incorporated therein.

6. A driving lane tracking system according to claim 1, further comprising a radar device for detecting other objects on the road.

* * * * *